(12) United States Patent
Lee et al.

(10) Patent No.: US 12,401,103 B2
(45) Date of Patent: Aug. 26, 2025

(54) BATTERY MODULE AND ASSEMBLING METHOD OF THE SAME

(71) Applicant: SK On Co., Ltd., Seoul (KR)

(72) Inventors: Gang U Lee, Daejeon (KR); Yun Joo Noh, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/418,523

(22) Filed: Jan. 22, 2024

(65) Prior Publication Data

US 2024/0250395 A1    Jul. 25, 2024

(30) Foreign Application Priority Data

Jan. 25, 2023  (KR) .................. 10-2023-0009650

(51) Int. Cl.
*H01M 50/609*  (2021.01)
*H01M 50/15*   (2021.01)
*H01M 50/507*  (2021.01)

(52) U.S. Cl.
CPC ......... *H01M 50/609* (2021.01); *H01M 50/15* (2021.01); *H01M 50/507* (2021.01)

(58) Field of Classification Search
CPC .................................................. H01M 20/609
See application file for complete search history.

(56) References Cited

U.S. PATENT DOCUMENTS

| | | | |
|---|---|---|---|
| 2019/0067656 A1* | 2/2019 | Zhang | H01M 50/289 |
| 2019/0259982 A1* | 8/2019 | Goirgini | C08J 9/0038 |
| 2021/0273210 A1* | 9/2021 | Gaither | H01M 50/543 |
| 2022/0181715 A1* | 6/2022 | Jiang | B32B 5/18 |
| 2022/0255170 A1* | 8/2022 | Kotik | H01M 50/271 |

FOREIGN PATENT DOCUMENTS

| | | |
|---|---|---|
| EP | 3451407 A1 | 3/2019 |
| EP | 4002554 A1 | 5/2022 |
| EP | 4152550 A1 | 3/2023 |
| KR | 10-1941115 B1 | 1/2019 |
| KR | 10-1943542 B1 | 1/2019 |
| KR | 10-2128588 B1 | 6/2020 |
| KR | 10-2022-0029941 A | 3/2022 |
| KR | 10-2024-0173160 A | 12/2024 |
| KR | 10-2024-0173161 A | 12/2024 |

OTHER PUBLICATIONS

European Patent Office; Appl. 24153770.3; Extended European Search Report; Jun. 25, 2024.

* cited by examiner

*Primary Examiner* — Brian R Ohara
(74) *Attorney, Agent, or Firm* — Jones Day (57) ABSTRACT

The present disclosure relates to a battery module and an assembling method of the same including: a cell assembly including a plurality of battery cells and a busbar assembly for electrically connecting the plurality of battery cells; a case forming a cell accommodating space for accommodating the cell assembly therein; and a filler portion provided between the plurality of battery cells and the busbar assembly inside the case and including a flame-retardant material.

15 Claims, 7 Drawing Sheets

BATTERY MODULE AND ASSEMBLING METHOD OF THE SAME

CROSS-REFERENCE TO RELATED PATENT APPLICATION

The present application claims priority under 35 U.S.C. § 119(a) to Korean patent application number 10-2023-0009650 filed on Jan. 25, 2023, in the Korean Intellectual Property Office, the entire disclosure of which is incorporated by reference herein.

BACKGROUND OF THE INVENTION

1. Field

The present disclosure relates to a battery module, which is a collection of secondary batteries or battery cells, and a method of assembling the battery module. More specifically, it relates to a battery module that delays thermal propagation of battery cells and a method of assembling the battery module.

2. Description of the Related Art

Recently, due to fire or explosion accidents occurring during the use of lithium secondary batteries, social concerns about the safety of battery use are increasing. Based on these social concerns, one of the recent major developmental tasks of lithium secondary batteries is to eliminate instabilities such as fire and explosion caused by thermal runaway of battery cells.

In particular, a typical battery module only considers a gap between a tab of any one battery cell and a tab of another adjacent battery cell, but does not consider the height of battery cells. In this case, there is a problem that it is impossible to prevent a gas generated from a battery cell in which thermal runaway has occurred from escaping through an empty space in a tab direction.

SUMMARY OF THE INVENTION

First, a technical problem that one aspect of the present disclosure is intended to solve is to prevent or mitigate escape of a high-temperature gas generated from a battery cell in which thermal runaway has occurred, among one or more battery cells provided inside a battery module, in a tab direction of the battery cell.

Second, a technical problem that another aspect of the present disclosure is intended to solve is to vente a high-temperature gas generated from a battery cell in which thermal runaway has occurred, in an intended path.

Third, a technical problem that still another aspect of the present disclosure is intended to solve is to add a process of positioning a filler portion between tabs of a busbar assembly and a battery to an existing battery module assembly process.

Meanwhile, a battery module according to the present disclosure can be widely applied in the field of green technology, such as electric vehicles, battery charging stations, energy storage systems (ESS), solar power generation (photovoltaics), and wind power generation using batteries. In addition, a battery module according to the present disclosure can be used in eco-friendly mobility including electric vehicles and hybrid vehicles to prevent climate change by suppressing air pollution and greenhouse gas emissions.

To solve the above-described problem, in a battery module according to the present disclosure, a filler made of a flame-retardant and heat-resistant material is positioned in an empty space of a battery module, specifically between a battery cell and a busbar assembly.

More specifically, a battery module according to the present disclosure may include: a cell assembly including a plurality of battery cells and a busbar assembly for electrically connecting the plurality of battery cells; a case defining a cell accommodating space for accommodating the cell assembly therein; and a filler portion provided between the plurality of battery cells and the busbar assembly inside the case and including a flame-retardant material.

The plurality of battery cells may each include: a cell body portion generating or storing electrical energy; and a tab portion protruding from the cell body portion toward the busbar assembly and electrically connecting the cell body portion and the busbar assembly, wherein the filler portion may be positioned in a filler space defined between one side face of the cell body portion from which the tab portion protrudes and the busbar assembly.

The tab portion may include a first tab and a second tab protruding from the cell body portion toward the busbar assembly any one direction among directions perpendicular to the height direction of the case, wherein the busbar assembly may include: a first busbar electrically connected to the first tab and a first busbar frame supporting the first busbar; and a second busbar electrically connected to the second tab and a second busbar frame supporting the second busbar, and wherein the filler space may include: a first filler space provided between a part in which the first tab is positioned and the first busbar frame; and a second filler space provided between a part in which the second tab is positioned and the second busbar frame.

Along a direction from the first filler space to the second filler space, the length of the first filler space may be different from the length of the second filler space.

The battery module may further include: a heat dissipating portion positioned between the cell assembly and a bottom surface of the cell accommodating space to dissipate heat generated from the plurality of battery cells to the outside through the case, wherein the heat dissipating portion may be positioned between the first filler space and the second filler space.

The filler portion may be formed of a polymer material that is cured after being injected into the filler space.

The filler portion may be filled in the filler space in a liquid form.

The filler portion may include: a body portion including an insertion groove extending along the height direction of the case to insert the tab portion and electrically connect the tab portion to the busbar assembly; and a connecting portion extending from one side of the body portion in a direction toward the busbar assembly.

The battery module may further include: a first insulation cover positioned in a direction from the outside of the first busbar frame to one side face of the case which is positioned closer to the first busbar frame, among both side faces facing the first busbar frame, to insulate between the first busbar and the case; and a second insulation cover positioned in a direction from the second busbar frame to the other face of the case to insulate between the second busbar and the case.

The cell assembly may further include a first end plate and a second end plate respectively connected to the first insulation cover and the second insulation cover to surround the plurality of battery cells.

The battery module may further include a module cover coupled to the first insulation cover, the second insulation cover, the first end plate, and the second end plate.

Based on a bottom face of the cell accommodating space, the maximum height of the filler portion may be more than half of the maximum height of the plurality of battery cells positioned in the cell accommodating space.

Meanwhile, the case may include: a module body including an opening portion in an upper portion thereof, extending along a first direction, which is any one direction among directions perpendicular to the height direction of the case, and formed in a U-shape of which both side faces perpendicular to the first direction are open; and a module cover coupled to the module body to close the opening portion.

The battery module may further include a heat dissipating portion positioned between the cell assembly and a bottom face of the cell accommodating space to dissipate heat generated from the plurality of battery cells to the outside through the case.

The filler portion may further include a heat-resistant material.

Meanwhile, a method of assembling a battery module according to the present disclosure, which is a method of assembling a battery module including a cell assembly including a plurality of battery cells and a busbar assembly for electrically connecting the plurality of battery cells; a case forming a cell accommodating space for accommodating the cell assembly therein, may include: a step of coupling a module cover coupled with one face of the case with the cell assembly; a step of inverting the cell assembly coupled with the module cover; and a step of forming a filler portion between the busbar assembly and the one or more battery cell.

In the step of forming a filler portion, the filler portion may be moved toward the inverted cell assembly to face an inner side of the bus bar assembly.

In the step of forming a filler portion, the filler portion in a liquid state may be injected to be filled between the plurality of battery cells and the busbar assembly.

The method of assembling a battery module may further include a step of coupling a module body defining the cell accommodating space together with the module cover with the module cover, after forming of the filler portion.

In addition, the method of assembling the battery module may further include a step of re-inverting the module body after coupling the module body to the module cover.

First, according to one embodiment of the present disclosure, escape of a gas generated from a battery cell in which thermal runaway has occurred, among a plurality of battery cells provided inside a battery module, in a tab direction of the battery cell may be prevented or mitigated. Through this, the stability of the battery module may be improved.

Second, according to another embodiment of the present disclosure, a high-temperature gas generated from a battery cell in which thermal runaway has occurred may be vented in an intended path.

Third, according to still another embodiment of the present disclosure, a process of positioning a filler portion may be added to an existing battery module assembly process without making a significant change.

DETAILED DESCRIPTION

Hereinafter, preferred embodiments of the present disclosure will be described in detail with reference to the attached drawings. The configuration or control method of the device described below is only for explaining the embodiments of the present disclosure and is not intended to limit the scope of the present disclosure, and the same reference numerals used throughout the specification indicate the same components.

Specific terms used in the present specification are merely for convenience of explanation and are not used to limit the illustrated embodiments.

A battery cell described in the present specification refers to a basic unit of a lithium secondary battery, specifically a lithium-ion battery, that can be used by charging and discharging electrical energy. The main components of the battery cell are a cathode, an anode, a separator, and an electrolyte, and the battery cell is manufactured by putting these main components into a case (or pouch). The battery cell may include a tab that is each connected to the cathode and the anode for electrical connection to the outside and protrudes to the outside of the pouch.

Meanwhile, a battery module described in the present specification refers to a battery assembly in which the battery cells are bundled in one or more numbers and put into a case to protect them from external shock, heat, vibration, or the like. The plurality of battery cells may supply electricity to the outside or receive electricity from the outside through a busbar assembly that is electrically connected.

In addition, a battery pack refers to a set in which a preset number of battery modules are gathered together and electrically connected to achieve a final desired voltage or power.

Figure 1:
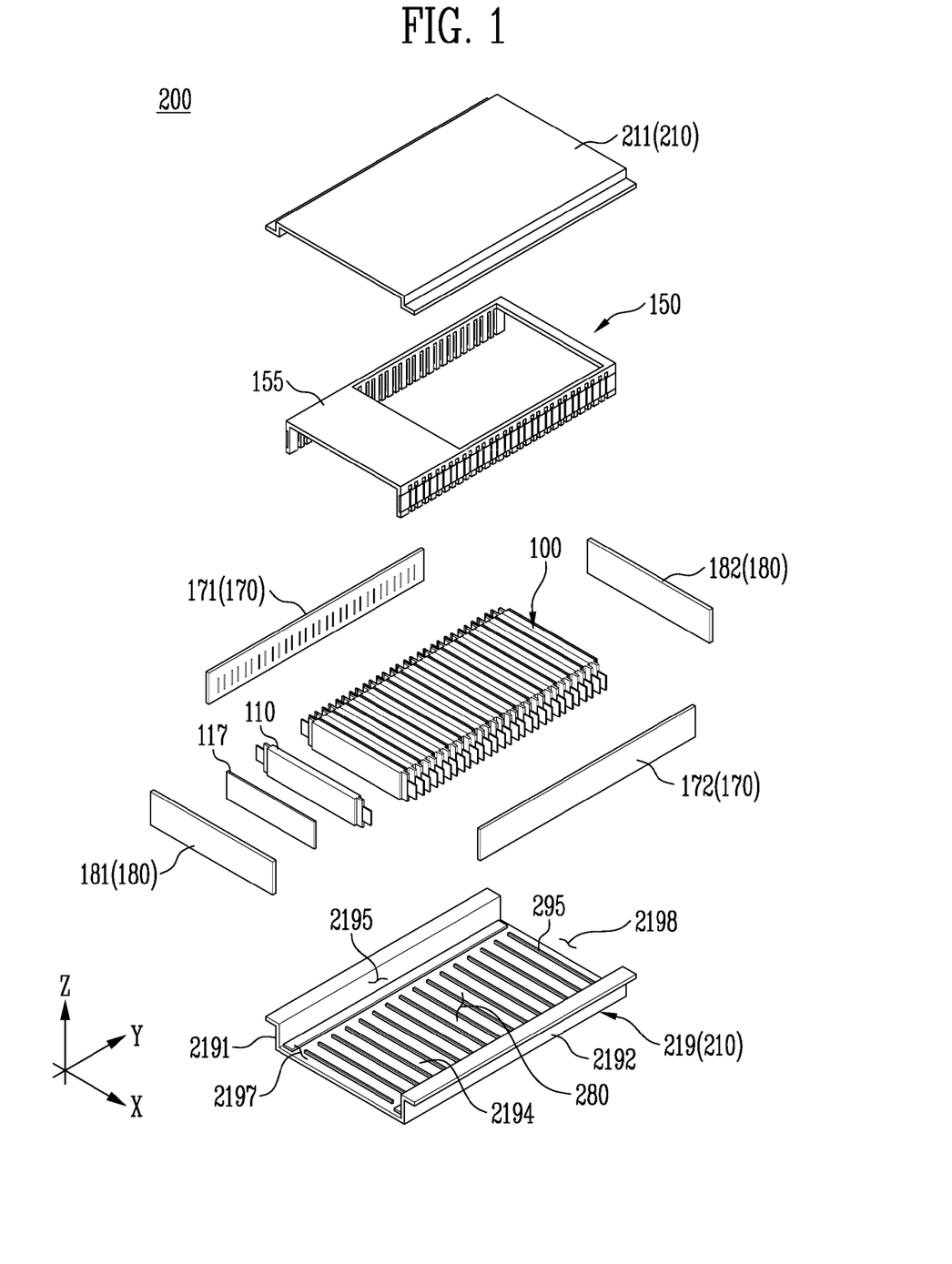
FIG. 1 shows an exploded view of a battery module.

FIG. 1 is an exploded view of a battery module 200. Referring to FIG. 1, the battery module 200 may include a plurality of battery cells 110 and a busbar assembly 150 electrically connected to the plurality of battery cells 110. In particular, after the plurality of battery cells 110 are stacked, they may be electrically connected by the busbar assembly 150. This is referred to as a cell assembly 100. The busbar assembly 150 may be electrically connected to the outside to store (or charge) electric energy in the plurality of battery cells 110, or supply the electric energy stored in the plurality of battery cells 110 to the outside (or discharge).

The battery module 200 may further include a case 210 defining a cell accommodating space 280 for accommodating the cell assembly 100. The case 210 is intended to protect the cell assembly 100 from the outside.

The case 210 may include a module body 219 accommodating the cell assembly 100 and a module cover 211 coupled to the module body 219 to define the cell accommodating space 280.

The module body 219 may be provided in a channel shape or a U-shape in which an upper portion of the cell accommodating space 280 is opened. Therefore, among the side faces of the module body 219, both side faces 2197, 2198 facing each other may also be opened. For example, referring to FIG. 1, among the side faces of the module body 219, both side faces extending along the X-direction may be open.

In the present disclosure, the height direction of a case 210 was set to the +Z direction. The +Z direction is a direction assuming that a module cover 211 is at an upper portion a module body 219. On the other hand, the −Z direction is a direction assuming that the case 210 is turned over and the module cover 211 is positioned at a lower portion of the module body 219.

In addition, in the present disclosure, the X-direction is one direction among directions perpendicular to the height direction of the case 210, and when the case 210 has a hexahedral shape, among four side faces forming side faces of the case, two side faces facing each other will extend along the X-direction, and the other two facing side face 2191, 2192 of among the four side faces will extend along the Y-direction. In the present specification, for convenience, a direction parallel to a long edge of the case was set as the Y-direction, and a direction parallel to a short edge of the case was set as the X-direction.

The cell assembly 100 may further include a buffering member 117 provided between at least a part of the plurality of battery cells 110. Therefore, the cell assembly 100 may include one or more of the buffer members 117. The buffering member 117 may be positioned between the battery cells 110, or after the plurality of battery cells 110 are grouped into a preset number, it may be positioned between the grouped battery cells. The buffer member 117 is intended to reduce the pressure exerted on other battery cells 110 when the battery cell 110 is swelling. Therefore, the cell assembly 100 may include one or more buffering members 117.

The plurality of battery cells 110 and the buffering member 117 may be provided at preset positions and stacked. For example, referring to FIG. 1, an example is shown in which long edges of the plurality of battery cells 110 are arranged side by side in the X-direction. Therefore, the plurality of battery cells 110 and the buffering member 117 will be positioned to overlap in the X-direction.

The cell assembly 100 may further include end portions 180 at both ends of the cell assembly 100, that is, when the plurality of battery cells 110 are stacked, on exposed faces of the battery cells 110 positioned at the first and last ends.

The end portion 180 is intended to prevent both side faces of the cell assembly 100 from being exposed to the outside.

The battery module 200 may further include an insulating cover 170 coupled to both side faces among the side faces the cell assembly except for the side faces where the end portion 180 is positioned. That is, the end portion 180 and the insulating cover 170 may be connected perpendicularly to each other.

The insulating cover 170 will extend side by side to the busbar assembly 150, and both ends of the insulating cover 170 will be connected to the end portion 180.

Meanwhile, each of the plurality of battery cells 110 may include a rectangular parallelepiped-shaped cell body portion 115 (see FIG. 2C) that produces or stores electrical energy; and a tab portion 119 (see FIG. 2C) protruding from the cell body portion 115 along the X-direction (first direction).

Specifically, the tab portion 119 may include: a first tab 119a (see FIG. 2C) and a second tab 119b (see FIG. 2C) protruding from both side faces of the cell body portion 115 in a direction away from the cell body portion 115. This is an example, and both of the tab portions 119 may be provided on a single side face.

Figure 2A:
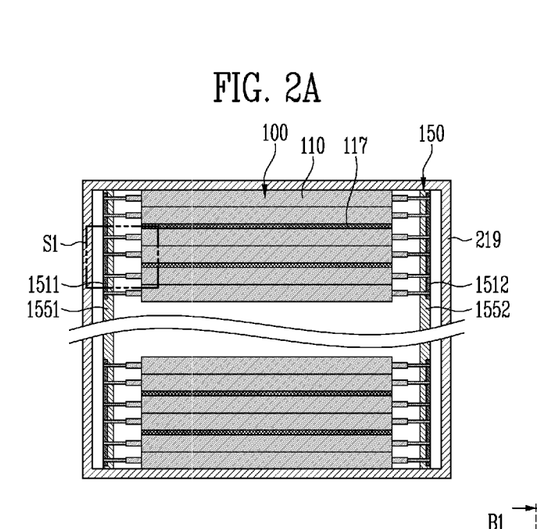
FIG. 2A shows an example of a cross-section of the battery module.
Figure 2B:
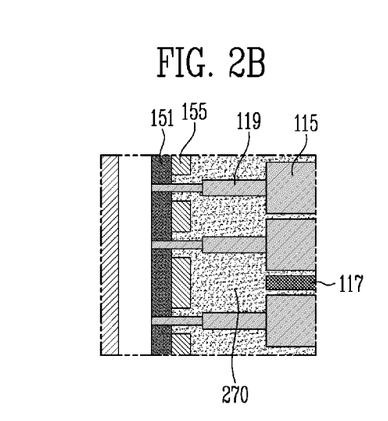
FIG. 2B shows an enlarged diagram of a part of the cross-section of FIG. 2A.
Figure 2C:
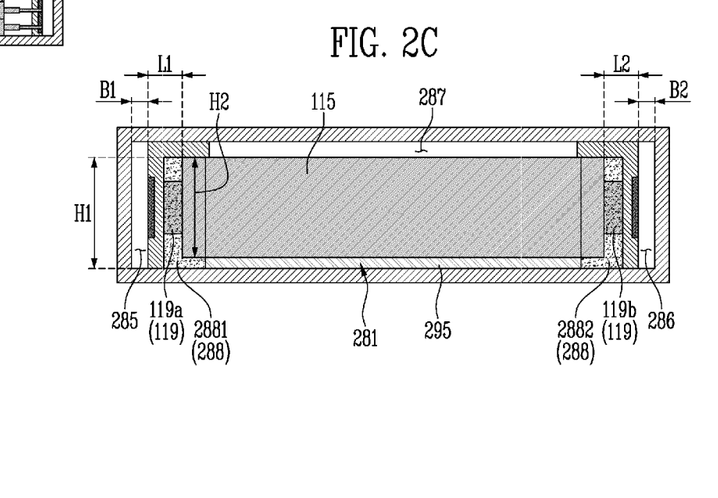
FIG. 2C shows an example of a cross-section of the battery module viewed from another direction.

Referring to FIGS. 1 and 2C, the cell assembly 100 may include a busbar assembly 150 into which the first tab 119a and the second tab 119b are each inserted and electrically connected. Specifically, the busbar assembly 150 may include: a first busbar 1511 (see FIG. 2A) electrically connected to the first tab 119a and a first busbar frame 1551 supporting the first busbar 1511 (see FIG. 2A); and a second busbar 1512 (see FIG. 2A) electrically connected to the second tab 119b and a second busbar frame 1552 supporting the second busbar 1512.

In other words, since the first tab 119a and the second tab 119b are disposed on both sides of the cell body portion 115, corresponding thereto, the first busbar 1511 and the second busbar 1512, which are electrically connected to the first tab 119a and the second tab 119b, respectively, will also be positioned on the side faces on which the first tab 119a and the second tab 119b are disposed. Likewise, the first busbar frame 1551 and the second busbar frame 1552 may also be positioned on the side face on which the first tab 119a and the second tab 119b are positioned.

The busbar assembly 150 may further include a frame connecting portion 155 connecting the first busbar frame 1551 and the second busbar frame 1552 to each other and supporting the same. The cell assembly 100 may further include a wire (not shown) provided on the frame connecting portion 155 to electrically connect the busbar assembly 150 to the outside.

In addition, the end portion 180 may be provided with a first end plate 181 and a second end plate 182 coupled to both side faces of the cell assembly, among the side faces of the cell assembly, which are provided side by side in a direction from the first tab 119a toward the second tab 119b.

Therefore, the plurality of battery cells 110 and the buffering member 117 will be positioned between the first end plate 181 and the second end plate 182.

When the insulating cover 170 is coupled to the first end plate 181 and the second end plate 182, it may further include: a first insulating cover 171 provided outside the first busbar 1551 and the first busbar frame 1551; and a second insulating cover 172 provided outside the second busbar 1512 and the second busbar frame 1552.

The first end plate 181, the second end plate 182, the first insulating cover 171, and the second insulating cover 172 will have a form including the one or more battery cells 110 therein.

Meanwhile, the case 210 may further include: a base panel forming a bottom face of the cell accommodating space 280, that is, a lower face of the module body 219; and a first side panel 2191 and a second side panel 2192 bent at both edges provided in parallel with the Y-direction, among the edges of the base panel 2194, to extend toward the module cover 211. Through this, the module body 219 may be in the form of a U-shaped channel in which both faces along the X-direction are open and the upper face is open.

The battery module 200 may further include a heat dissipating portion 295 provided between the module body 219 and the cell assembly 100 to be in contact with the cell assembly 100. The heat dissipating portion 295 is intended to radiate heat that is generated from the cell assembly 100 to the outside. For example, the heat dissipating portion 295 may be provided in the form of a heat dissipating pad or thermal adhesive with excellent thermal conductivity.

FIG. 2A shows an example of a cross-section of the battery module. That is, FIG. 2A is an example of a cross-section of the battery module 200 viewed from above. As described above, the cell assembly 100 may be in the form of a stack of a plurality of battery cells 110 and a shock absorbing member 117. Each of the plurality of battery cells 110 may include the first tab 119a (see FIG. 2C) and the second tab 119b (see FIG. 2C) provided at both end areas of the battery cell 110. In addition, the cell assembly 100 may include a busbar assembly 150 into which the first tab 119a and the second tab 119b are each inserted and electrically connected. Specifically, the busbar assembly 150 may include: a first busbar 1511 electrically connected to the first tab 119a and a first busbar frame 1551 supporting the first busbar 1511; and a second busbar 1551 electrically connected to the second tab 119b and a second busbar frame 1552 supporting the second busbar 1512.

FIG. 2B shows an enlarged diagram of S1 part, which is a part of the cross-section of FIG. 2A. FIG. 2C shows an example of a cross-section of the battery module viewed from another direction.

Referring to FIGS. 2B and 2C, the cell accommodating space 280 in which the cell assembly 100 is accommodated may be subdivided into several spaces. For example, examples of the subdivided space may include: an installation space 281 in which the cell assembly 100 is positioned; a first space 285 provided outside the first busbar 1511 and the first busbar frame 1551; a second space 286 provided outside the second busbar 1512 and the second busbar frame 1552; and a cover space 287 provided between an upper portion of the cell assembly 100 and the module cover 211 (see FIG. 1).

Since the first insulating cover 171 (see FIG. 1) and the second insulating cover 172 (see FIG. 1) may be positioned in the first space 285 and the second space 286, respectively, the first space and the second space may refer to a space excluding the first insulating cover 171 and the second insulating cover 172.

In addition to the subdivided spaces, an empty space may also be defined between the plurality of battery cells 110 and the busbar assembly 150. Specifically, an empty space may also be positioned between a side face of the cell body portion 115 where the first tab 119a is positioned and the first busbar frame 1551, and between a side face of the cell body portion 115 where the second tab 119b is positioned and a second busbar frame 1552. This is because at least a portion of the first tab 119a and the second tab 119b are inserted into the first busbar 1511 and the second busbar 1512 and are electrically connected, so that an empty space may be formed therebetween.

In other words, the battery module 200 may further include a filler space 288 defined between the plurality of battery cells 110 and the busbar assembly 150.

More specifically, the battery module 200 include a first filler space 2881 and a second filler space 2882 between one side face of each cell body portion 115 of any one of the plurality of battery cells 110 and the first busbar frame 1551 and between the other side face of each cell body portion 115 of any one of the plurality of battery cells 110 and the second busbar frame 1552, respectively.

One side face of the cell body portion 115 may be a side face on which the first tab 119a is positioned, and the other side face of the cell body portion 115 may be a side face on which the second tab 119b is positioned.

When the cell assembly 100 is installed in the case 210, since the length of the first tab 119a and the second tab 119b along the height direction of the case 210 is shorter than the length of the battery cell 110, both the first filler space 2881 and the second filler space 2882 may be communicated.

The battery module 200 may include a filler portion 270 that is positioned in the filler space 288 and made of a material having heat-resistance and/or flame-retardance.

Meanwhile, referring to FIG. 2C, the materials of the filler portions 270 positioned in the first filler space 2881 and the second filler space 2882 may be different from each other. In addition, the length of the first filler space 2881 and the length of the filler space 288 along the direction from the first tab 119a to the second tab 119b, that is, the X-direction, may be different from each other. This is intended to use a filler portion 270 with a desired function at a desired position for more efficient space utilization.

The battery module 200 may include a heat dissipating portion 295 at a lower portion of the cell assembly 100, that is, between the cell assembly 100 and the base panel 2194 (see FIG. 1). The heat dissipating portion 295 is intended to transfer heat generated from the cell assembly 100 to the outside.

The heat dissipating portion 295 may be positioned below the first filler space 2881 and the second filler space 2882. This is because a part that requires heat transfer from the battery cell 100 to the outside is the cell body portion 115.

Referring to FIG. 2B, when the filler portion 270 is made of a liquid material, the filler portion 270 may also enter between the plurality of stacked battery cells 110 and the buffering member 117. This is because, even when the plurality of battery cells 110 and the buffering member 117 are in contact with each other without a gap, the filler portion 270 may enter into a gap that is not visible to the naked eye due to a capillary phenomenon.

However, when the filler portion 270 is in a liquid form, considering the viscosity of the filler portion 270, the amount entering the gap will not be very large. Likewise, even when the filler portion 270 is in a liquid state, the heat dissipating portion 295 and the filler portion 270 may be separated so that they may be distinguished rather than mixed. This is because the density and viscosity of the filler portion 270 and the heat dissipating portion 295 are different from each other.

In addition, in the battery module 200, based on a direction from the first tab 119a to the second tab 119b, the length B1 of the first space 285 may be different from the length L1 of the first filler space 2881. Likewise, the length B2 of the second space 286 may be different from the length L2 of the second filler space 2882.

In general, in the battery module 200, based on a direction from the first tab 119a to the second tab 119b, the length B1 of the first space 285 may the same as the length L1 of the first filler space 2881. However, not being limited thereto, the length L1 of the first filler space 2881 may be different from the length L2 of the second filler space 2882.

In addition, based on the height direction of the case 210, the height H2 of the battery cell 110 may be different from the height of the filler portion 270. For example, based on the height direction of the case 210, the height H2 of the battery cell 110 may be smaller than the height of the filler portion 270. This is due to the height of the heat dissipating portion 295.

In other words, referring to FIG. 2C, based on the bottom face of the cell accommodating space 280, the maximum height H1 of the filler portion 270 may be different from the maximum height of the plurality of battery cells 110 positioned in the cell accommodating space 280.

Preferably, based on the bottom face of the cell accommodating space 280, the maximum height H1 of the filler portion 270 will be equal to or greater than the maximum height of the plurality of battery cells 110 positioned in the cell accommodating space 280. However, not being limited thereto, based on the bottom face of the cell accommodating space 280, when the maximum height H1 of the filler portion 270 is provided to be half the maximum height of the battery cell 110 or greater, functions of the filler portion 270 described in the present disclosure may be performed.

Figure 3A:
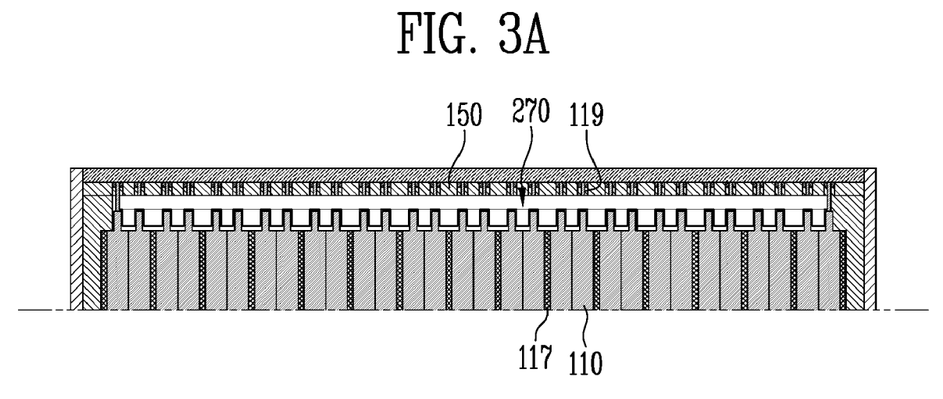
FIGS. 3A and 3B show another example of a filler portion.
Figure 3B:
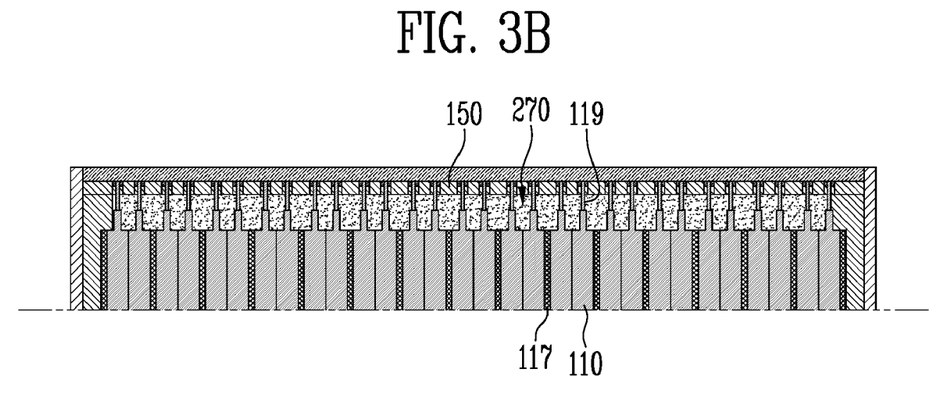

FIGS. 3A and 3B show another example of a filler portion 270. The filler portion 270 may include a heat-resistant and/or flame-retardant material. Therefore, as long as the material is a heat-resistant and/or flame-retardant material, the phase of the filler portion 270 may be liquid or solid.

In addition, the filler portion 270 may be a composite material made of several materials rather than a single material. Some materials may be provided to satisfy heat-resistance, and other materials may be provided for flame-retardancy. In addition, rather than being mixed and provided as one integrated form, the various materials may be separated and have a stacked form.

When thermal runaway occurs at a specific battery cell 110 of the cell assembly 100, the temperature will rise rapidly. As a result, an electrolyte or the like provided inside the battery cell 110 where thermal runaway has occurred may be evaporated to generate a gas, which may cause a swelling phenomenon in the battery cell 110. When a swelling phenomenon occurs, a joint portion of the tab portion 119 may be gaped.

In other words, as a joint portion of the tab portion 119 is gaped, a high-temperature gas or smoke trapped inside may be discharged in a direction where the tab portion 119 is positioned. This may be referred to as thermal runaway. This may cause a high-temperature gas or smoke to be discharged in an unintended direction, thereby accelerating heat propagation to other adjacent battery cells 110.

Therefore, when thermal runaway occurs, the filler portion 270 may prevent a joint portion of the tab portion 119 and the cell body portion 115 (see FIG. 2C) from gaping, thereby preventing a high-temperature gas or smoke from being discharged in a direction where the tab portion 119 is positioned.

Alternatively, the filler portion 270 may mitigate discharge of the high-temperature gas or smoke in a direction where the tab portion 119 is positioned through a joint portion of the tab portion 119 and the cell body portion 115 (see FIG. 2C).

Referring to FIG. 3A, the filler portion 270 may be provided in a solid form. That is, the filler portion 270 may be molded into a desired shape in advance before being assembled into the cell assembly 100.

Meanwhile, referring to FIG. 3A, an example is shown in which the buffering member 117 is each provided between battery cells 110 grouped in pairs. This is just one example, and the buffering member 117 does not need to be disposed between the battery cells in an equally set interval.

FIG. 3B shows an example in which the filler portion 270 is provided in a liquid state and filled in the filler space 288 (see FIG. 2C). Even when it is in a liquid state, considering the viscosity, which will be described later, the filler portion 270 may remain in the filler space 288 even after time passes.

As described above, the filler portion 270 may include a heat-resistant and/or flame-retardant material. Preferably, the filler portion 270 may be formed of a solid, liquid, or post-cured liquid type material.

For heat-resistance, the filler portion 270 may include a silicone resin, an epoxy resin, or a urethane resin. Preferably, the filler portion 270 may have a 5% weight loss temperature of 400° C. or higher in a thermogravimetric analysis (TGA), or an 800° C. remaining weight of 70% by weight or higher. Due to these characteristics, the stability of the battery module at high temperatures can be further improved. In the thermogravimetric analysis (TGA), measurement may be performed within a range of 25° C. to 800° C. at a temperature increase rate of 20° C./min in a nitrogen ($N_2$) environment of 60 $cm^3$/min.

In addition, the filler portion 270 may also perform a function of securing the plurality of battery cells 110. For example, a solid state filler portion 270 or a filler portion 270, which is injected in a liquid state and then cured, may prevent the tab portion 119 from being deformed by an external shock or the like, after the tab portion 119 is inserted into the busbar assembly 150. A liquid state filler portion 270 will also be able to prevent deformation of the tab portion 119 to some extent due to the viscosity thereof.

In particular, a filler portion 270, which is injected in a liquid state and then cured, specifically includes an acrylic resin, an epoxy resin, a urethane resin, an olefin resin, an ethylene vinyl acetate (EVA) resin, a silicone resin, or the like.

As described above, for the functions of the filler portion 270, various materials may be mixed. In addition, a liquid state filler portion 270 or a cured type filler portion 270, may further include a viscosity modifying agent, for example, a thixotropic agent, a diluent, a dispersant, a face treatment agent, or a coupling agent, in order to control the viscosity in a liquid state.

The thixotropic agent may adjust the viscosity of a resin composition according to the shear force to ensure that the manufacturing process of the battery module is carried out effectively. Examples of applicable thixotropic agents include fumed silica or the like. Preferably, the viscosity of the filler portion 270 may be 100 cPs (centi-poise) or more and 600 (cPs) or less based on 25° C.

A diluent or a dispersant is usually used to lower the viscosity of a resin composition, and various types known in the industry may be used without limitation as long as they can exhibit the abovementioned effect. A face treatment agent is for face treatment of a filler introduced into the filler portion 270, and various types known in the industry can be used without limitation as long as they can exhibit the abovementioned effect.

The filler portion 270 may include a flame-retardant material. A flame-retardant material refers to a material that is difficult to melt at high temperatures. For example, various known flame-retardants may be applied as a flame-retardant material without any particular limitation, and for example, flame-retardants in the form of a solid filler or liquid flame-retardants may be applied. Flame-retardants include, for example, organic flame-retardants such as melamine cyanurate and inorganic flame-retardants such as magnesium hydroxide, but are not limited thereto.

For example, in the present specification, a flame-retardant material may mean a polymer material that has a V-0 class in the 94V test (vertical burning test) of Underwriter's Laboratory (UL), which is a flame-retardant standard for polymer materials.

Specifically, the filler portion 270 may further include a heat-resistant or flame-retardant material. The heat-resistant or flame-retardant material include phosphorus-based, halogen-based, and inorganic flame-retardants, and a phosphorus-based flame-retardant material may preferably include a phosphate compound, a phosphonate compound, a phosphinate compound, a phosphine oxide compound, a phosphazene compound, and a metal salt thereof. These may be used individually or in combination of two or more types.

Preferably, a temperature range in which the filler portion 270 has the intended heat resistance and flame-retardancy may be −60° C. or higher and 120° C. or lower.

In addition, the solid or cured filler portion 270 may preferably have appropriate hardness. That is, this is to ensure the impact resistance and vibration resistance of the filler portion 270 without high brittleness of the filler portion 270 so that the filler portion 270 has improved durability. Preferably, the hardness of the filler portion 270 may be 35 or more and 45 or less.

In addition, the filler portion 270 may include an electrically insulating material. Through this, the dielectric strength of the pillar portion 270 may preferably be at least 3.0 (kV/mm).

In addition, the thermal conductivity of the filler portion 270 may preferably be 0.05 (W/m-K) or less. Considering that the filler portion 270 is a heat-resistant material, the thermal conductivity of the filler portion 270 will be smaller than that of the heat dissipating portion 295.

When the filler portion 270 is a foam material, which is injected in a liquid state and then cured, considering the thermal conductivity and use temperature range required for the filler portion 270, the foam density of the foam material may be 0.1 (g/cm$^3$) or more and 0.2 (g/cm$^3$) or less upon free rise.

Figure 4A:
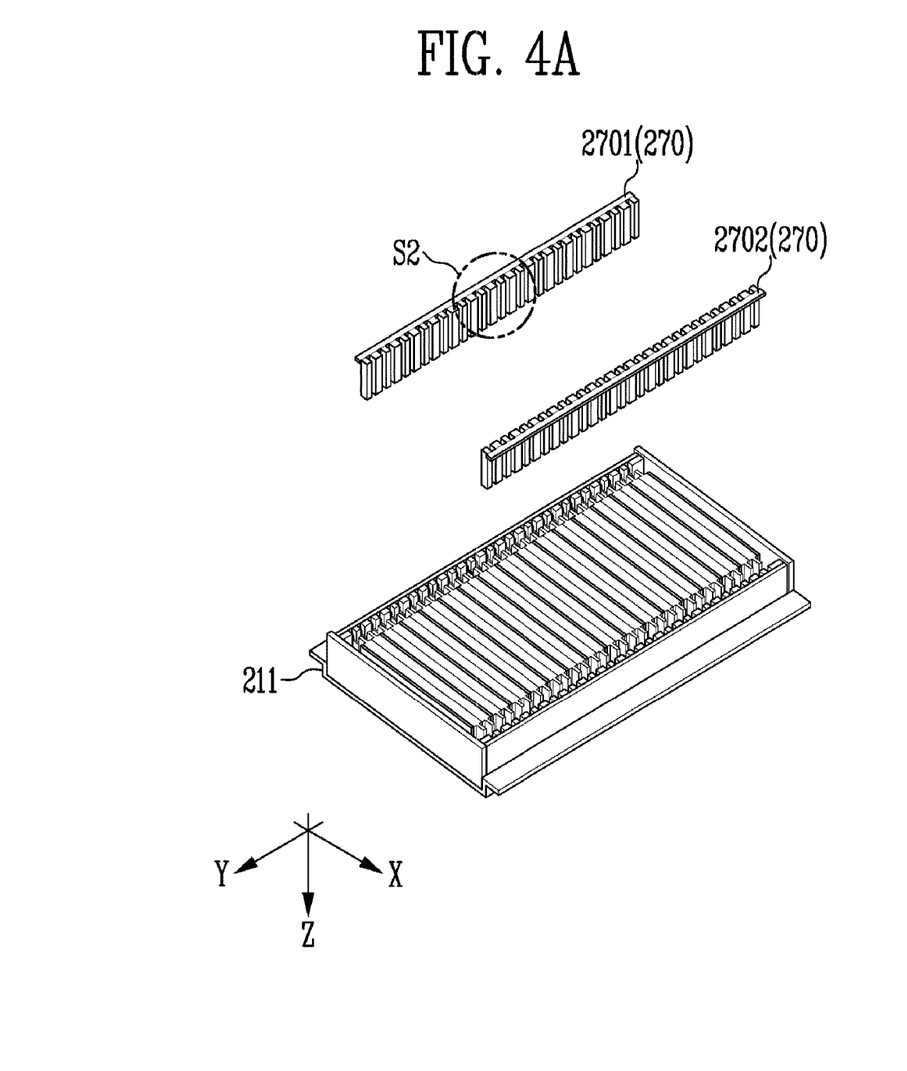
FIG. 4A shows an example of a filler portion molded into a preset shape.
Figure 4B:
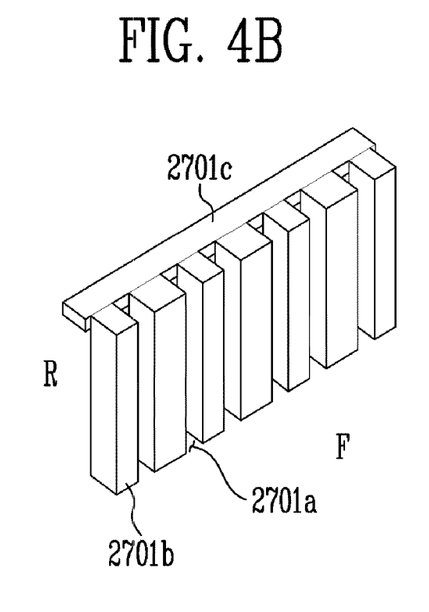
FIG. 4B shows an enlarged diagram of a part of the filler portion.

FIG. 4A shows an example of a filler portion 270 molded into a preset shape; and FIG. 4B shows an enlarged diagram of a part of the filler portion 270.

Referring to FIG. 4A, the filler portion 270 may be in a solid form. That is, the filler portion 270 may be molded into a preset shape before being coupled to the cell assembly 100. Preferably, the filler portion 270 may be provided in the form of a foam.

The filler portion 270 may be coupled after inverting the battery module 200 being assembled. In the conventional process, in the cell assembly 100 (see FIG. 1), the module cover 211 may be coupled before the module body 219 (see FIG. 1). Therefore, to insert the filler portion 270 between the plurality of battery cells 110 and the busbar assembly 150 in a state in which the module cover 211 is coupled, the battery module 200 being assembled will be inverted, and then the filler portion 270 will be inserted.

Specifically, the filler portion 270 may include: a first filler portion 2701 accommodated in the first filler space 2881 (see FIG. 2C); and a second filler portion 2702 accommodated in the second filler space 2882 (see FIG. 2C).

FIG. 4B is an enlarged view of S2 region in FIG. 4A. For explanation, a direction toward the cell assembly 100 (see FIG. 1) is determined as front (F), and a direction toward the plurality of battery cells 110 (see FIG. 1) is indicated as rear (R). In addition, referring to FIG. 4A, the Z-direction is indicated downward, which is intended to emphasize that the module cover 211 is below the cell assembly 100, as the battery module 200 being assembled is inverted.

In order to be accommodated between the plurality of battery cells 110 and the busbar assembly 150, the filler portion 270 may be provided in an individual form to be inserted between tab portions 119 of each of any one battery cell 110 (see FIG. 1) and another adjacent battery cell 110. However, in this case, the assembly time may be long, and a lot of empty space may remain between the plurality of battery cells 110 and the busbar assembly 150.

To this end, the filler portion 270 may further include: a body portion 2701*b* inserted between tab portions 119 of each of the plurality of battery cells 110; and a connecting portion 2701*c* positioned at one end positioned farther from the module cover 211, among both ends of the body portion 2701*b*, and connecting the body portion 2701*b*.

When the body portions 2701*b* are provided in a plural number, in order that the filler portion 270 may not interfere with electrical connection of each of the tab portions 119 to the busbar assembly 150, the plurality of body portions 2701*b* may be spaced in a constant interval and further include inserting portions 2701*a* in the form of a hole or a groove between the plurality of body portions. The positions of the insertion portions 2701*a* will be arranged to correspond to the positions of the tab portions 119.

When the filler portion 270 is positioned in the filler space 288 (see FIG. 2C), the connecting portion 2701*c* is caught on the tab portion 119 and thus it may play the role of a stopper upon the installation of the filler portion 270.

In addition, the connecting portion 2701*c* may be provided in a form extending toward the rear where the busbar assembly 150 is positioned. This is intended to fill a space between the busbar assembly 150 and the base panel 2194 (see FIG. 1).

Figure 5:
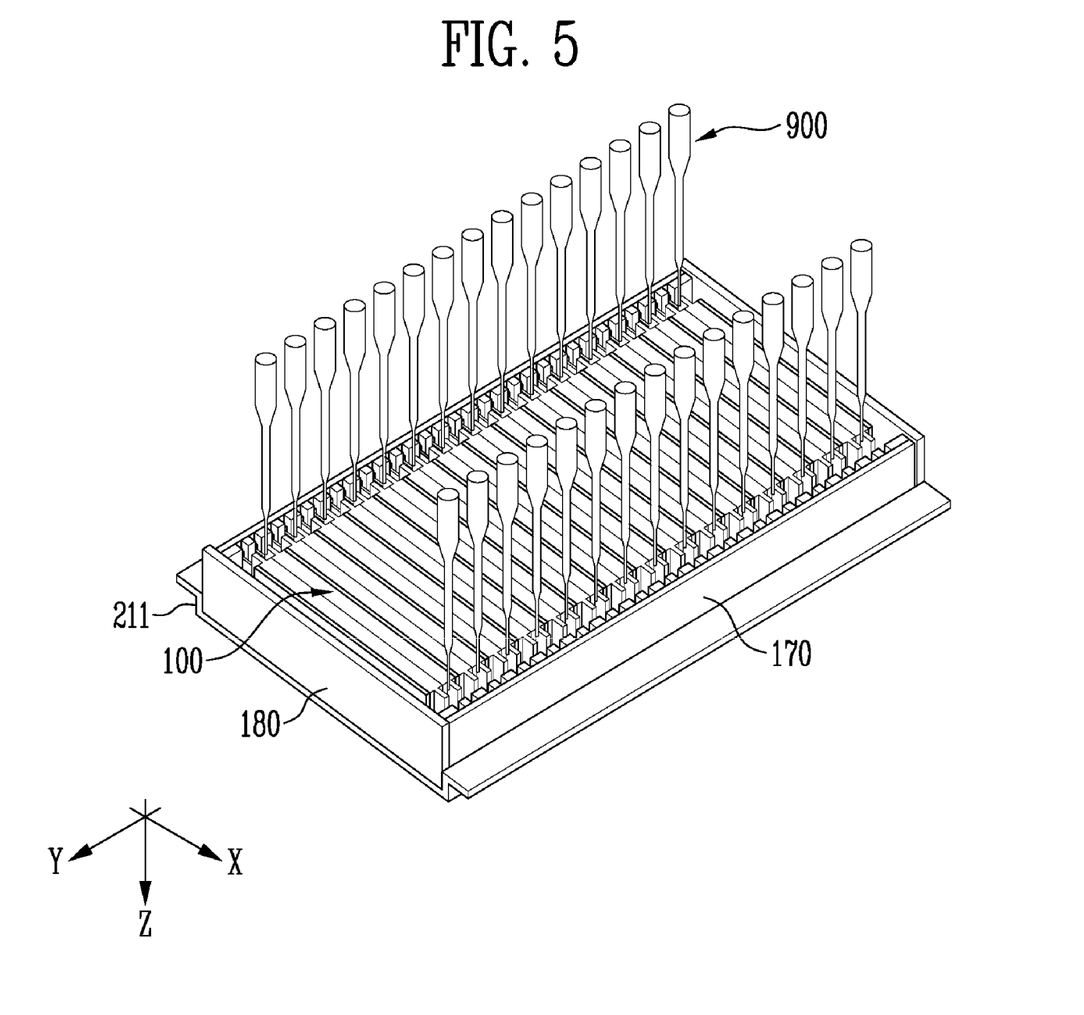
FIG. 5 shows an example of a method of injecting a filler portion injected in a liquid form.

FIG. 5 shows an example of a method of injecting a filler portion 270 injected in a liquid form. Referring to FIG. 5, the Z-direction is indicated downward, which is intended to emphasize that the module cover 211 is below the cell assembly 100, as the battery module 200 being assembled is inverted.

The battery module 200 being assembled, shown in FIG. 5, has an end portion 180 and an insulating cover 170 coupled, and after the module cover 211 is coupled, the battery module 200 being assembled is in an inverted form. Therefore, it can be seen that the end portion 180 and the insulating cover 170 play the role of side faces, and the module cover 211 plays the role of a bottom face so that a type container that can contain a liquid is formed by the module cover 211, the end portion 180, and the insulating cover 170.

Therefore, the inverted battery module 200 may accommodate a liquid filler portion 270 in a filler space 288. FIG. 5 shows an example of an injecting portion 900 injecting a filler portion 270 of a liquid form into a first filler space 2881 and a second filler space 2882.

The injecting portion 900 may include dispensers each disposed between a tab portion 119 (see FIG. 2C) and another tab portion 119 of a plurality of battery cells 110. Through this, the injection portion 900 will be able to inject a liquid filler portion 270 into all filler spaces 288 simultaneously. For understanding, FIG. 5 does not show all of the injection portions 900, but only shows them sparsely in a few places.

Figures 6A, 6B:
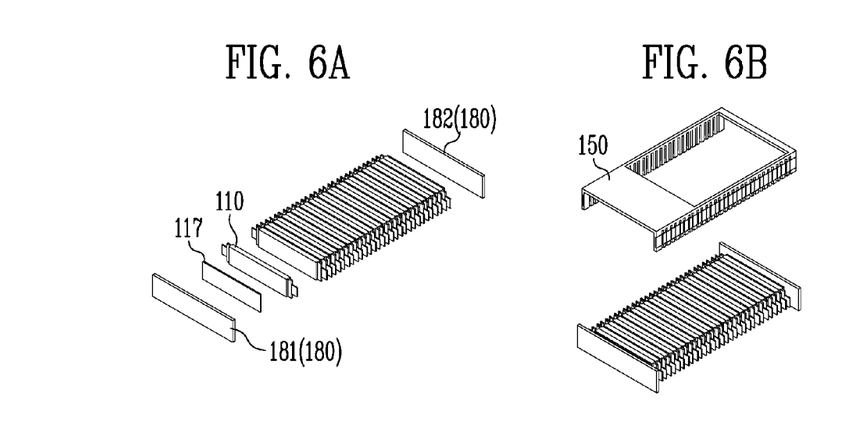
FIGS. 6A to 6F briefly show an example of a method of assembling the battery module.
Figure 7:
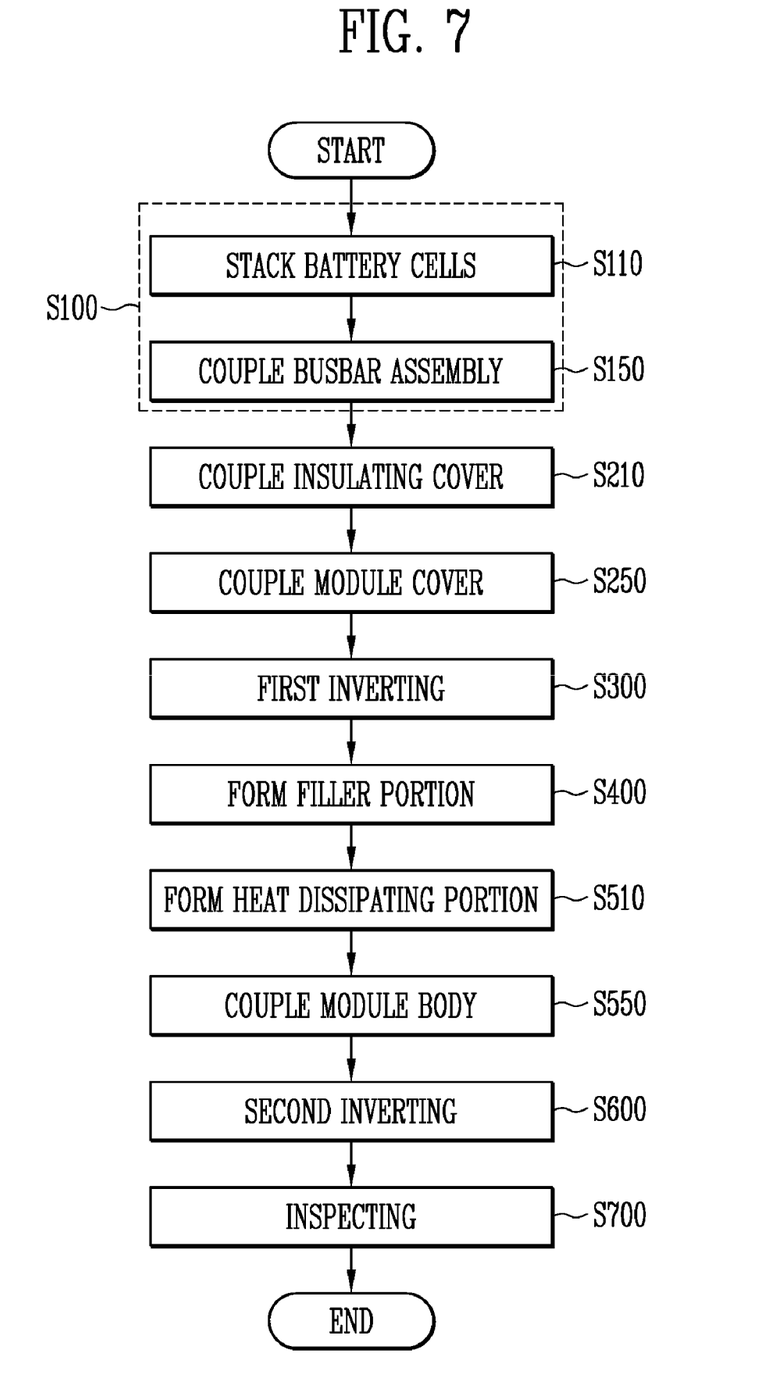
FIG. 7 shows a flowchart of an example of the method of assembling the battery module.

In contrast, the injection portions 900 may be disposed one by one in the first filler spaces 2881 (see FIG. 2C) and the second filler spaces 2882 (FIG. 2C) to sequentially fill each filler space 288 with a liquid filler portion 270. However, considering the time required to fill the filler spaces 288 with a filler portion 270, it may be preferable to fill the filler spaces 288 simultaneously. FIGS. 6A and 6B briefly show an example of a method of assembling the battery module 200. FIG. 7 shows a flowchart of an example of the method of assembling the battery module 200.

Referring to FIGS. 6A and 7, the assembling method of the present disclosure includes a step S100 of assembling a cell assembly 100 including the plurality of battery cells 110 and a busbar assembly 150 electrically connected to the plurality of battery cells 110.

Specifically, referring to FIGS. 6A and 7, the step S100 of assembling a cell assembly 100 may include a stacking step S110 of stacking the plurality of battery cells 110 and a buffering member 117 positioned between the plurality of battery cells 110. In addition, the stacking step S110 may include stacking each of a first end plate 181 and a second end plate 182 at the first and last in a perpendicular direction of the busbar assembly 150 or in a direction in which the plurality of battery cells 110 are stacked.

Referring to FIGS. 6B and 7, the step S100 of assembling a cell assembly 100 may further include a step S150 of connecting a busbar assembly 150 to the stacked battery cells 110, after the stacking step S110.

Since the tab portions 119 of the plurality of battery cells 110 are positioned in an opposite direction with each other, the busbar assembly 150 may also include: a first busbar 1511 and a first busbar frame 1551 coupled to one face to which the first tab 119a (see FIG. 2C) is coupled; and a second busbar 1512 and a second busbar frame 1552 coupled to one face to which the second tab 119b (see FIG. 2C) is coupled. The first tab 119a may be electrically connected to the first busbar 1511, and the second tab 119b may be electrically connected to the second busbar 1512.

Figure 6C:
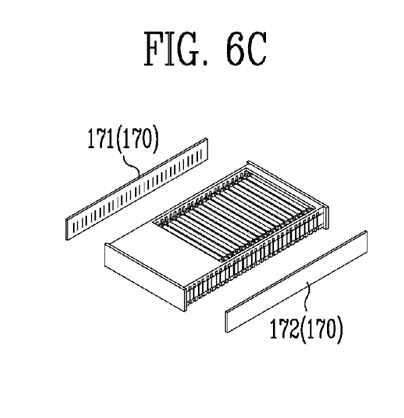

Referring to FIGS. 6C and 7, thereafter, the assembling method of the present disclosure may further include a step S210 of coupling an insulating cover 170 provided in a parallel direction to the busbar assembly 150 to the cell assembly 100.

A first insulating cover 171 among the insulating covers 170 may be coupled in a direction in which the first busbar 1511 is positioned, and a second insulating cover 172 among the insulating covers 170 may be coupled in a direction in which the second busbar 1512 is positioned. The first insulating cover 171 and the second insulating cover 172 will be coupled to the first end plate 181 and the second end plate 182.

Figure 6D:
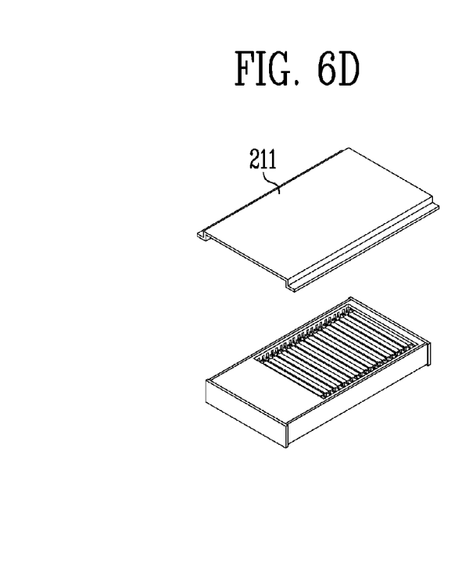

Thereafter, referring to FIGS. 6D and 7, after coupling the first insulating cover 171 and the second insulating cover 172, the assembling method of the present disclosure may include a step S250 of coupling the module cover 211 to the cell assembly 100. The reason for assembling the module cover 211 before the module body 219 (see FIG. 6F) is to protect the busbar assembly 150 during the assembly process.

Thereafter, the assembling method of the present disclosure may go through a first inverting step S300 of inverting the battery module 200 being assembled. The reason for inverting the battery module 200 being assembled is to locate the filler portion 270 into the first filler space 2881 (see FIG. 2C) and the second filler space 2882 (see FIG. 2C). Since it is difficult to insert the filler portion 270 from above due to the already assembled module cover 211, the battery module 200 being assembled is inverted to locate the filler portion 270.

Figure 6E:
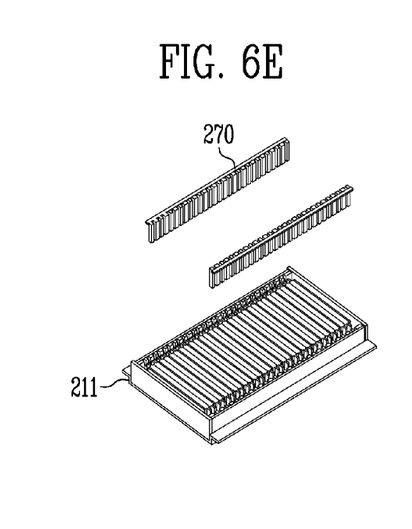

Referring to FIGS. 6E and 7, the assembling method of the present disclosure may include a step S400 of forming the filler portion 270 after the first inverting step S300.

When the filler portion 270 has a preset shape in a solid state, like an example shown in FIG. 6E, the filler portion 270 may be caused to approach the module cover 211 from an opposite direction of the module cover 211 to locate the filler portion 270 to the filler space 288.

When the filler portion 270 is in a liquid state or a type that is injected as a liquid and then cured, like an example shown in FIG. 5, the filler portion 270 may be formed by filling the same into the filler space 288 using the injection portion 900.

Figure 6F:
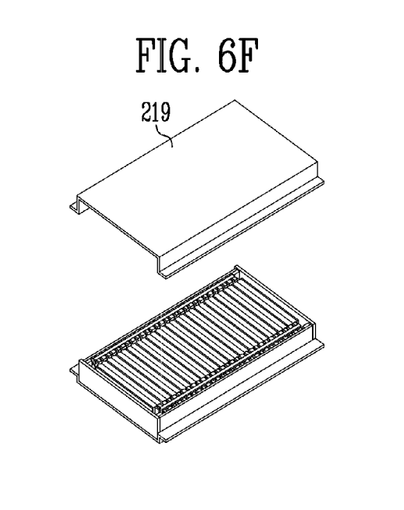

Referring to FIGS. 6F and 7, the assembling method of the present disclosure may further include a step S550 of coupling the module body 219 to the module cover 211.

Since the battery module 200 being assembled has already been inverted, the module body 219 may be caused to approach the module cover 211 in a direction from top to bottom for coupling S550 to the module cover 211.

Meanwhile, as described above, the battery module 200 may further include a heat dissipating portion 295 on a base panel 2194 (see FIG. 1), which is a lower face of the module body 219, or on a bottom face of the cell accommodating space 280. To this end, the assembling method of the present disclosure may include a step of forming the heat dissipating portion 295 on the base panel 2194 by injecting or coating the heat dissipating portion before coupling S550 the module body 219 to the module cover 211.

After the module body 219 and the module cover 211 are coupled, the assembling method of the present disclosure may include a second inverting step S600 of re-inverting the battery module 200 so that the module cover 211 may be positioned on top. This is for inspecting S700 of the battery module 200 in a normal state.

The present disclosure may be modified and implemented in various forms, and its scope is not limited to the embodiments described above. Therefore, if a modified embodiment includes components of the present disclosure, it should be regarded as falling within the scope of the rights of the present disclosure.

What is claimed is:
1. A battery module comprising:
a cell assembly including a plurality of battery cells, one or more of buffering members provided between the plurality of battery cells, and a busbar assembly for electrically connecting the plurality of battery cells, wherein the busbar assembly includes a busbar and a busbar frame supporting the busbar;
a case defining a cell accommodating space for accommodating the cell assembly therein; and
a filler portion provided between the plurality of battery cells and the busbar frame or between one or more of buffering members and the busbar frame inside the case and including a flame-retardant material.
2. The battery module according to claim 1, wherein the plurality of battery cells each include: a cell body portion generating or storing electrical energy; and a tab portion protruding from the cell body portion toward the busbar assembly and electrically connecting the cell body portion and the busbar assembly, and
wherein the filler portion is positioned in a filler space defined between one side face of the cell body portion from which the tab portion protrudes and the busbar assembly.
3. The battery module according to claim 2, wherein the tab portion includes a first tab and a second tab protruding from the cell body portion toward the busbar assembly along any one direction among directions perpendicular to the height direction of the case,
wherein the busbar is formed by a plurality of busbars, and the plurality of busbars include: a first busbar electrically connected to the first tab and a second busbar electrically connected to the second tab, wherein the busbar frame is formed by a plurality of busbar frames, and the plurality of busbar frames include a first busbar frame supporting the first busbar and a second busbar frame supporting the second busbar, and wherein the filler space includes: a first filler space provided between a part in which the first tab is positioned and the first busbar frame; and a second filler space provided between a part in which the second tab is positioned and the second busbar frame.

4. The battery module according to claim 3, wherein, along a direction from the first filler space to the second filler space, the length of the first filler space is different from the length of the second filler space.

5. The battery module according to claim 3, further comprising: a heat dissipating portion positioned between the cell assembly and a bottom face of the cell accommodating space to dissipate heat generated from the plurality of battery cells to the outside through the case, wherein the heat dissipating portion is positioned between the first filler space and the second filler space.

6. The battery module according to claim 2, wherein the filler portion is formed of a polymer material that is cured after being injected into the filler space.

7. The battery module according to claim 2, wherein the filler portion is filled in the filler space in a liquid form.

8. The battery module according to claim 2, wherein the filler portion includes:
body portions inserted between tab portions of the plurality of battery cells; and
a connecting portion positioned lower than the body portions, the connecting portion configured to connect each end of the body portions.

9. The battery module according to claim 3, further comprising: a first insulation cover positioned in a direction from the outside of the first busbar frame to one side face of the case which is positioned closer to the first busbar frame, among both side faces facing the first busbar frame, to insulate between the first busbar and the case; and a second insulation cover positioned in a direction from the second busbar frame to the other face of the case to insulate between the second busbar and the case.

10. The battery module according to claim 9, wherein the cell assembly further includes a first end plate and a second end plate respectively connected to the first insulation cover and the second insulation cover to surround the plurality of battery cells.

11. The battery module according to claim 10, further comprising: a module cover coupled to the first insulation cover, the second insulation cover, the first end plate, and the second end plate.

12. The battery module according to claim 1, wherein, based on a bottom face of the cell accommodating space, the maximum height of the filler portion is more than half of the maximum height of the plurality of battery cells positioned in the cell accommodating space.

13. The battery module according to claim 1, wherein the case includes: a module body including an opening portion in an upper portion thereof, extending along a first direction, which is any one direction among directions perpendicular to the height direction of the case, and formed in a U-shape of which both side faces perpendicular to the first direction are open; and a module cover coupled to the module body to close the opening portion.

14. The battery module according to claim 13, further comprising: a heat dissipating portion positioned between the cell assembly and a bottom face of the cell accommodating space to dissipate heat generated from the plurality of battery cells to the outside through the case.

15. The battery module according to claim 1, wherein the filler portion further includes a heat-resistant material.

* * * * *